United States Patent
Klein

(10) Patent No.: US 7,615,729 B2
(45) Date of Patent: Nov. 10, 2009

(54) APPARATUS AND METHOD FOR RESONANT LENS FOCUSING

(75) Inventor: Dean A. Klein, Eagle, ID (US)

(73) Assignee: Aptina Imaging Corporation, Grand Cayman (KY)

( * ) Notice: Subject to any disclaimer, the term of this patent is extended or adjusted under 35 U.S.C. 154(b) by 134 days.

(21) Appl. No.: 11/953,757

(22) Filed: Dec. 10, 2007

(65) Prior Publication Data

US 2009/0146047 A1  Jun. 11, 2009

(51) Int. Cl.
  *G01J 1/20* (2006.01)
  *G02B 3/10* (2006.01)
  *H04N 5/232* (2006.01)
  *H04N 5/225* (2006.01)

(52) U.S. Cl. ............ 250/208.1; 250/201.1; 250/201.8; 396/79; 396/80; 396/118; 359/824; 348/351

(58) Field of Classification Search ... 250/201.1–201.8, 250/208.1; 359/823, 824; 396/77–82, 96, 396/118, 133, 144, 322, 323; 348/351, 345, 348/349
See application file for complete search history.

(56) References Cited

U.S. PATENT DOCUMENTS

| | | | | |
|---|---|---|---|---|
| 4,291,958 | A * | 9/1981 | Frank et al. | 396/133 |
| 5,969,760 | A * | 10/1999 | Ernest et al. | 348/357 |
| 6,914,635 | B2 * | 7/2005 | Ostergard | 348/374 |
| 7,130,536 | B2 | 10/2006 | Ito | |
| 7,336,430 | B2 * | 2/2008 | George et al. | 359/708 |
| 7,504,608 | B2 * | 3/2009 | Klein | 250/201.1 |
| 2003/0007236 | A1 | 1/2003 | Schachar et al. | |
| 2003/0130562 | A1 | 7/2003 | Barbato et al. | |
| 2004/0017502 | A1 | 1/2004 | Alderson | |
| 2004/0135898 | A1 * | 7/2004 | Zador | 348/222.1 |
| 2004/0201773 | A1 * | 10/2004 | Ostergard | 348/374 |
| 2004/0234257 | A1 * | 11/2004 | McKevitt et al. | 396/133 |
| 2005/0275745 | A1 * | 12/2005 | Hsu | 348/351 |
| 2006/0087740 | A1 | 4/2006 | Hillis et al. | |
| 2006/0114534 | A1 | 6/2006 | Batchko | |
| 2006/0203095 | A1 | 9/2006 | Vittu | |

(Continued)

FOREIGN PATENT DOCUMENTS

EP  1 691 227  8/2006

(Continued)

OTHER PUBLICATIONS

Jie He, et al., "Modified Fast Climbing Search Auto-focus Algorithm With Adaptive Step Size Searching Technique for Digital Camera", IEEE, Apr. 3, 2003.

(Continued)

*Primary Examiner*—John R Lee
(74) *Attorney, Agent, or Firm*—Dickstein Shapiro LLP

(57) ABSTRACT

A method and apparatus for focusing an image on a pixel array. The method includes the steps of continuously changing the distance between a lens and a pixel array between a first distance and a second distance and obtaining an image projected onto the pixel array through the distance is changing. The apparatus includes a lens and an electromechanical structure to continuously change the distance between the lens and the pixel array between the first distance and the second distance.

25 Claims, 8 Drawing Sheets

U.S. PATENT DOCUMENTS

| | | |
|---|---|---|
| 2006/0204242 A1 | 9/2006 | Gutierrez et al. |
| 2007/0098380 A1 | 5/2007 | Spielberg |
| 2007/0104473 A1 | 5/2007 | Lee et al. |
| 2007/0114358 A1 | 5/2007 | Watkins et al. |
| 2007/0121213 A1 | 5/2007 | Tseng et al. |
| 2008/0037143 A1* | 2/2008 | Yoon .......................... 359/824 |
| 2008/0055753 A1* | 3/2008 | Takahashi et al. ........... 359/824 |
| 2008/0080073 A1* | 4/2008 | Saito et al. .................. 359/824 |
| 2008/0231974 A1* | 9/2008 | Jung .......................... 359/824 |
| 2008/0259471 A1* | 10/2008 | Chen et al. ................. 359/824 |
| 2009/0146047 A1* | 6/2009 | Klein ...................... 250/201.7 |

FOREIGN PATENT DOCUMENTS

| | | |
|---|---|---|
| JP | 60-47954 | 3/1985 |
| JP | 2005-122016 | 5/2005 |
| WO | WO 2007/005714 | 1/2007 |
| WO | WO 2007/030578 | 3/2007 |

OTHER PUBLICATIONS

Sung-Min Sohn et al., "SoC Design of an Auto-Focus Driving Image Signal Processor for Mobile Camera Applications", IEEE, 2006.

Feng Li et al., "A Fast Auto Focusing Method for Digital Still Camera", IEEE, Proceedings of the 4th International Conf. on Machine Learning and Cybernetics, China, Aug. 2005.

\* cited by examiner

APPARATUS AND METHOD FOR RESONANT LENS FOCUSING

FIELD OF THE INVENTION

Embodiments of the present invention generally relate to imaging devices, and specifically to imaging devices employing an adjustable focus assembly.

BACKGROUND OF THE INVENTION

To focus an image on an imaging array in a conventional digital camera a lens adjustment assembly is used to mechanically move one or more lenses in a linear direction relative to an image array from a known starting position, such as "infinity", to a focused position, at which the image is focused on the image array. The lens is then held at the focused position, while the image is acquired. Many lens adjustment assemblies move the lens using an electromechanical actuator, which may include technology such as voice-coils, electrically active polymers, or piezoelectric actuators. This movement may be made against resistance from a bias source, for example, a spring, which serves to return the lens to the lens starting position when the actuator is turned off.

Most cameras, including digital cameras, have an automatic focus feature (referred to herein as "auto focus") by which objects viewed through the camera can be focused on automatically. Auto focus systems are generally categorized as either active or passive systems. Active systems actually determine the distance between the camera and the subject of the scene, e.g., by measuring the total travel time of ultrasonic waves or infrared light emitted from the camera. Based on the total travel time, the distance between the camera and the subject of the scene may be calculated and the lens adjustment assembly moves the lens from the starting position to a focused position correlated to the calculated distance of the camera to the object.

Passive auto focus systems, on the other hand, rely on the light that is naturally reflected by the subject in the scene. One example of a passive auto focus system is a system that uses contrast analysis of a captured image to determine the best focal position for the camera lens. In a contrast analysis auto focus system, adjacent areas of a scene are compared with each other to measure differences in intensity among the adjacent areas. An out-of-focus scene will include adjacent areas that have similar intensities, while a focused scene will likely show a significant contrast between areas in which the subject of the scene is located and other areas of the scene (e.g., background objects). During focusing, the lens adjustment assembly moves the lens from the starting position to a number of intermediate positions until the focused position is finally determined (that is, when the lens position results in an image having the maximum intensity difference between adjacent areas).

In either passive or active auto focus systems, energy is used by the electromagnetic actuator to move and maintain the lens at various positions against the resistance of the spring. FIG. 1 shows the relative amount of power needed for the distance that the lens is to be displaced in a conventional lens adjustment assembly. It can be seen from FIG. 1 that the power needed to displace the lens increases as the amount of displacement increases. In some conventional lens adjustment assemblies, the electromagnetic actuators may require a large amount of power, which, for imaging devices operating on a limited power supply such as batteries, will drain the batteries and diminish the usefulness of the imaging device.

Accordingly, there is a desire and need for an imaging device with an auto focus capability that mitigates against these shortcomings.

DETAILED DESCRIPTION

In the following detailed description, reference is made to various specific embodiments that may be practiced. These embodiments are described with sufficient detail to enable those skilled in the art to practice them. It is to be understood that other embodiments may be employed, and that structural and electrical changes may be made.

In various embodiments described herein, an imaging device includes a lens adjustment assembly in which the lens is mounted to a mechanism that moves in a resonant manner throughout its range of motion. The timing of the resonant motion of the lens is synchronized to the imaging device so that an image may be obtained at the optimum focus position of the lens. The resonant motion of the lens is made possible by an elastic component that returns energy on every cycle and therefore may be achieved with very low power.

Figure 1:
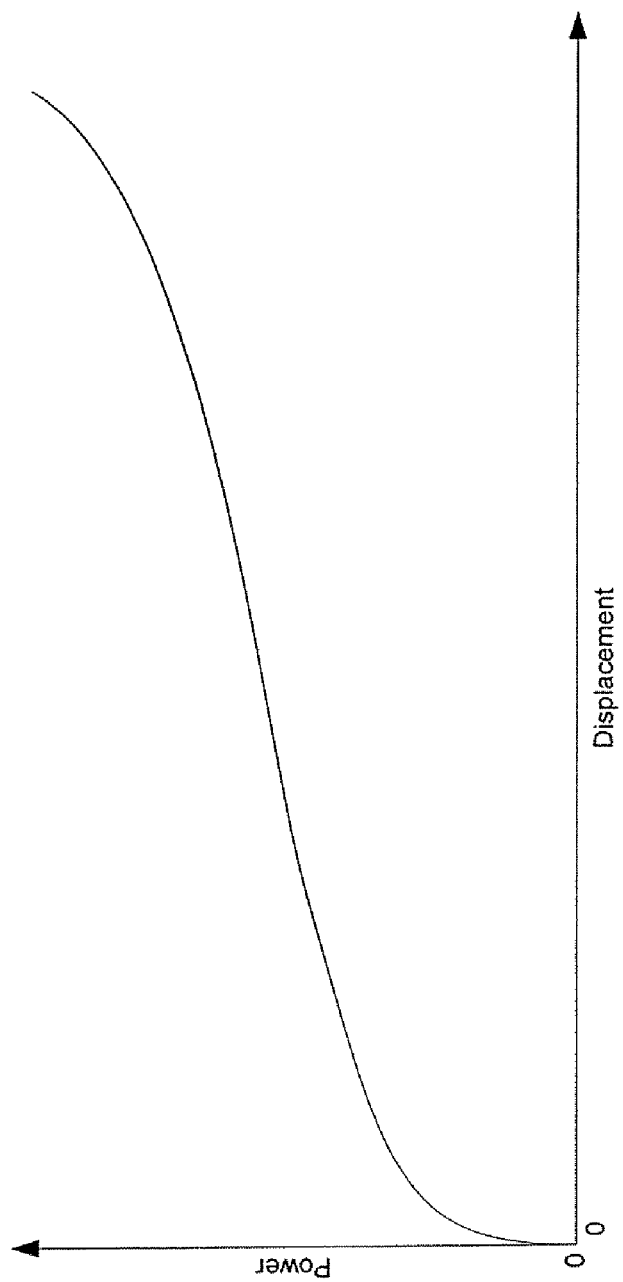
FIG. 1 is a graph of the relative amount of power needed for lens displacement in a conventional lens adjustment assembly.
Figure 2:
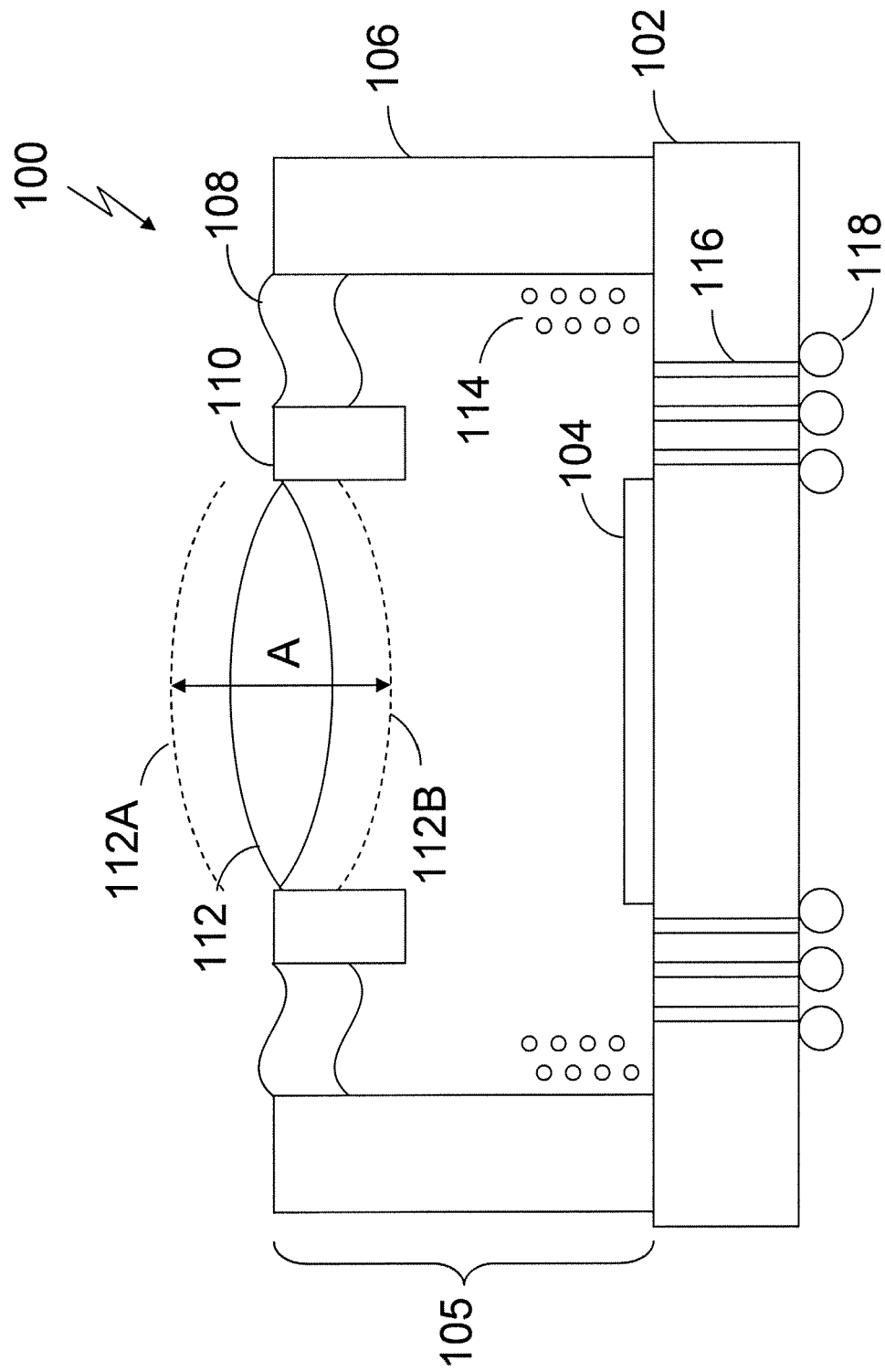
FIG. 2 is a cross-sectional view of an imaging device and a lens adjustment assembly according to an embodiment described herein.

FIG. 2 is a cross-sectional view of an imaging device 100 having a lens adjustment assembly 105 according to an embodiment. Imaging device 100 includes a substrate 102 supporting an imaging device circuit 104 having a pixel array. In the illustrated embodiment, the imaging device circuit 104 is shown as fabricated on top of substrate 102, but for this and other embodiments, the imaging device circuit 104, including the pixel array, may also be fabricated directly within a semiconductor substrate 102 along with other circuitry, if desired. The substrate 102 includes interconnects 116, which connect the imaging device circuit 104 to exterior circuits, and solder balls 118 through which the imaging device circuit 104 may be mounted to and electronically connected with other devices. Imaging device 100 also includes a lens adjustment assembly 105 that includes a support structure 106, a flexible membrane 108, a magnetic ring 110, actuation coils 114, and a lens 112.

In the lens focusing process, the actuation coils 114 act as a driving unit that is activated to provide excitation pulses that exert a force on the magnetic ring 110 and begin resonant motion of the lens 112. The flexible membrane 108 is an elastic component that allows the lens 112 and magnetic ring 110 to move up and down in the directions denoted by arrow A to an upper displacement position 112A and a lower displacement position 112B. In one embodiment, the range of motion of the lens 112 between the upper displacement position 112A and the lower displacement position 112B may be about 0.5 mm.

Figure 3:
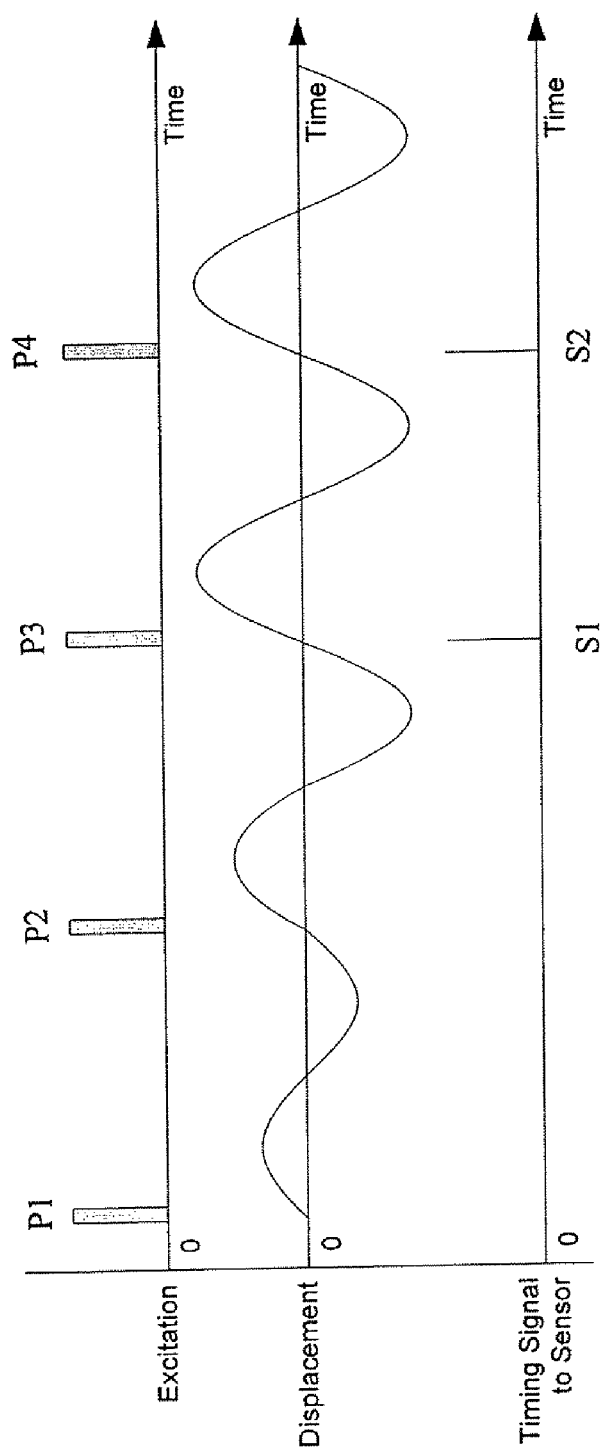
FIG. 3 shows a graph of the displacement of a lens over time according to an embodiment described herein.

FIG. 3 shows a graph of the displacement of the lens 112 over time in conjunction with the excitation pulses. At time zero, the actuation coils 114 apply a first excitation pulse P1 to the magnetic ring 110 to begin resonant movement of the lens 112. Subsequent excitation pulses P2, P3, P4 are applied to the magnetic ring 110 at the beginning of each resonant cycle. As shown in FIG. 3, the lens 112 has achieved a steady state resonant movement by the third excitation pulse. In other embodiments, however, a steady state resonant movement of the lens 112 may be established by fewer or more excitation pulses.

The frequency and amplitude of the resonant movement of the lens 112 are dependent on the mass of the moving elements, i.e., the lens 112 and the magnetic ring 110, and the spring constant of the flexible membrane 108. More or less displacement of the lens 112 may be achieved by using larger or smaller excitation pulses, respectively. The amplitude should be large enough to cover the desired focal length range of the lens 112.

The flexible membrane 108 is elastic so that the energy from the resonant motion of the lens 112 is conserved as the lens 112 moves up and down during each cycle. After steady state resonant motion is achieved, the excitation pulses from the actuation coils 112 are only needed to overcome motion loss due to friction, which may be very small. Due to the conservation of energy, very little power is needed for the excitation pulses to maintain the resonant motion of the lens 112 when compared to conventional methods of moving a lens from a start position to a focus position and holding it there while an image is acquired. In one embodiment, the excitation pulses from the actuation coils 112 may be generated using a voltage between about zero to 10 V and a power of about 100 µW to maintain the resonant motion of the lens 112.

Once the lens 112 has achieved a steady state resonant motion, the timing of the resonant motion of the lens 112 is synchronized to the operation of the imaging device circuit 104 by a timing signal sent to the device's pixel array so that an image may be obtained at a desired lens position, such as the focus position, e.g., the lens position at which an image is most focused. FIG. 3 shows a repeating timing signal ($S_1$, $S_2$ . . . ) that is generated by the lens adjustment assembly 105 and is sent to the imaging device circuit 104 when the lens 112 is at the zero displacement point. Using the timing signal ($S_1$, $S_2$ . . . ) the imaging device circuit 104 may interpolate the position of the lens 112 at any given time. In other embodiments, a timing signal may be sent to the imaging device circuit 104 when the lens 112 is at another point in the cycle, such as the upper displacement position 112A, the lower displacement position 112B, or other positions.

In one embodiment, a global shutter may be used so that the entire image is obtained by the pixel array of imaging device circuit 104 in a single instant at a particular lens 112 position. In another embodiment, an image may be constructed from multiple images obtained during multiple cycles to create a "hyper-focused" image. The frequency of the resonant motion of the lens 112 may be sufficiently high so that an image is obtained over many, even hundreds, of cycles.

In another embodiment, an imaging device using a system other than a global shutter, such as a rolling shutter, may read out a portion of the imaging device circuit 104 pixel array during each pass through the focus position over multiple cycles. For example, in an embodiment using a rolling shutter system, signals from one or more rows of pixels may be obtained and read out from the imaging device circuit 104 pixel array at a particular focus position during each cycle.

In another embodiment, selected regions of an image may be designated to be captured either in focus or out of focus. For example, in a "portrait mode" in which it is desired to focus only on a single subject, the portion of the image that contains the subject may be read out by the imaging device circuit 104 at a lens 112 position at which the subject is focused and the portion of the image that does not contain the subject, (i.e., the background), may be read out by the imaging device circuit 104 at a lens 112 position at which the background is not in focus. In another embodiment, multiple subjects in an image may be read out in focus while the remainder of the image may be read out unfocused. In one embodiment, the amplitude of the resonant motion of the lens 112 may be reduced in portrait mode.

The imaging device 100 may be used with active or passive auto focus techniques. In an active auto focus technique, the distance between the imaging device 100 and a subject may be measured and correlated to the desired focus position of the lens 112 using a stored look-up table. When the lens 112 is at the desired focus position during its resonant motion, the pixel array obtains an image. As described above, the imaging device circuit 104 determines the position of the lens 112 by interpolating the position of the lens using the timing signals ($S_1$, $S_2$ . . . ). In a passive auto focus technique, the imaging device circuit 104 may obtain a number of scene images at different positions as the lens 112 travels through the resonant motion cycle. Adjacent areas of the scenes for each of the images may then be compared with each other to measure differences in intensity and determine which focus position provides the optimum focus for the scene.

Figure 4C:
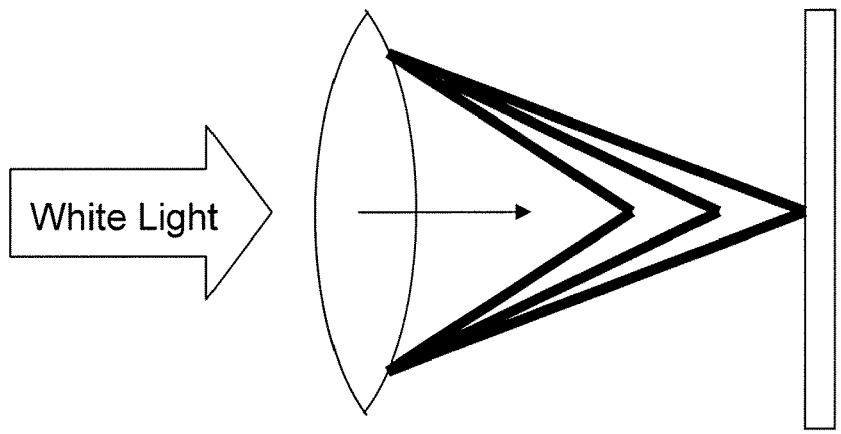
FIGS. 4A-4C are diagrams of lenses positioned according to a method of chromatic aberration correction according to an embodiment described herein.
Figure 4B:
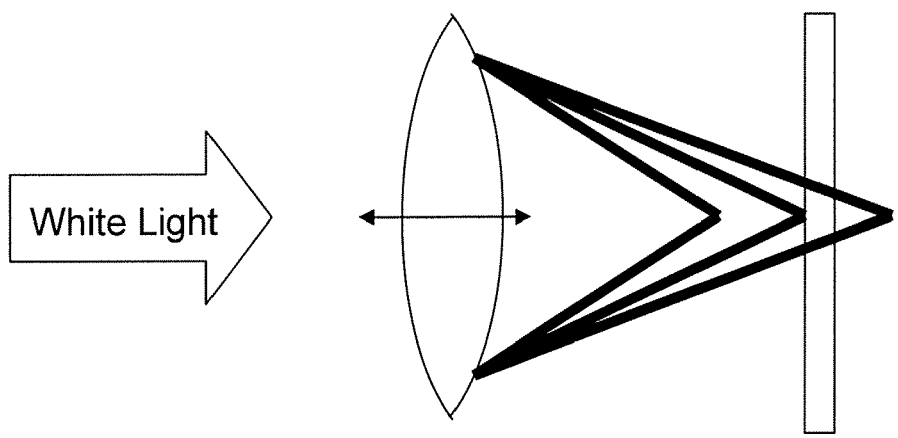
Figure 4A:
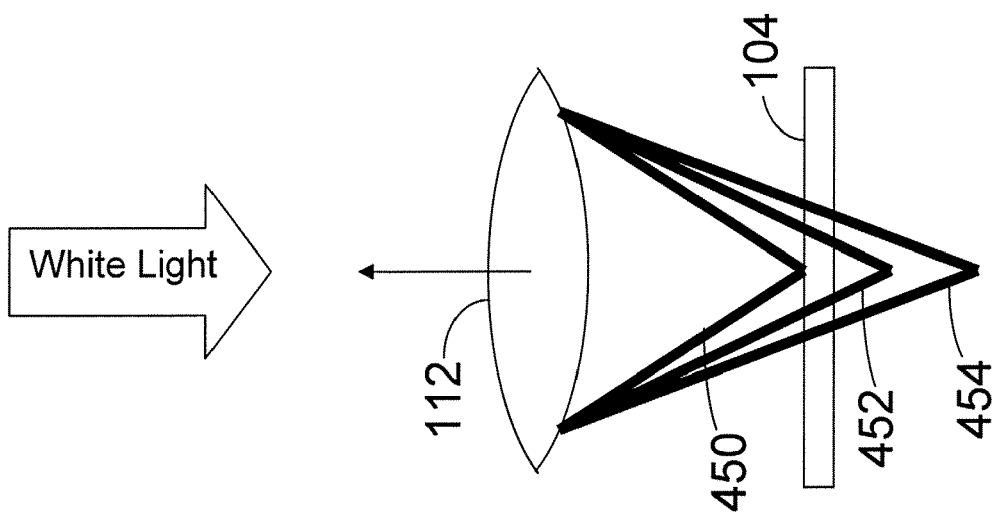

In another embodiment, the imaging device 100 may be used to compensate for chromatic aberrations due to refractive differences in red, green, and blue light. As shown in FIGS. 4A-4C, red 450, green 452, and blue light 454 each have different focal points in a silicon substrate due to their different wavelengths. To account for this difference, the different wavelengths of light may be captured by the imaging device circuit 104 at different lens 112 positions during the resonant motion cycle.

As shown in FIG. 4A, red light 450 is optimally focused at a lens 112 position relatively closest to the imaging device circuit 104. The red light 450 from an image may be obtained by the imaging device circuit 104 at this position by only activating the pixels in the imaging device circuit 104 that have a red color filter. As shown in FIG. 4B, green light 452 is optimally focused at a lens 112 position between that of red 450 and blue light 454. Green light may be read out by the imaging device circuit 104 at this position by activating only the pixels having a green color filter. As shown in FIG. 4C, blue light 454 is optimally focused at a lens 112 position relatively farthest from the imaging device circuit 104. Blue light may be captured by the imaging device circuit 104 at this position by activating only the pixels having a blue color filter.

The red, green, and blue images may be obtained during the same or different cycles. The red, green, and blue images may then be combined to form one image having all three colors, in which each color has been optimally focused.

Figure 5:
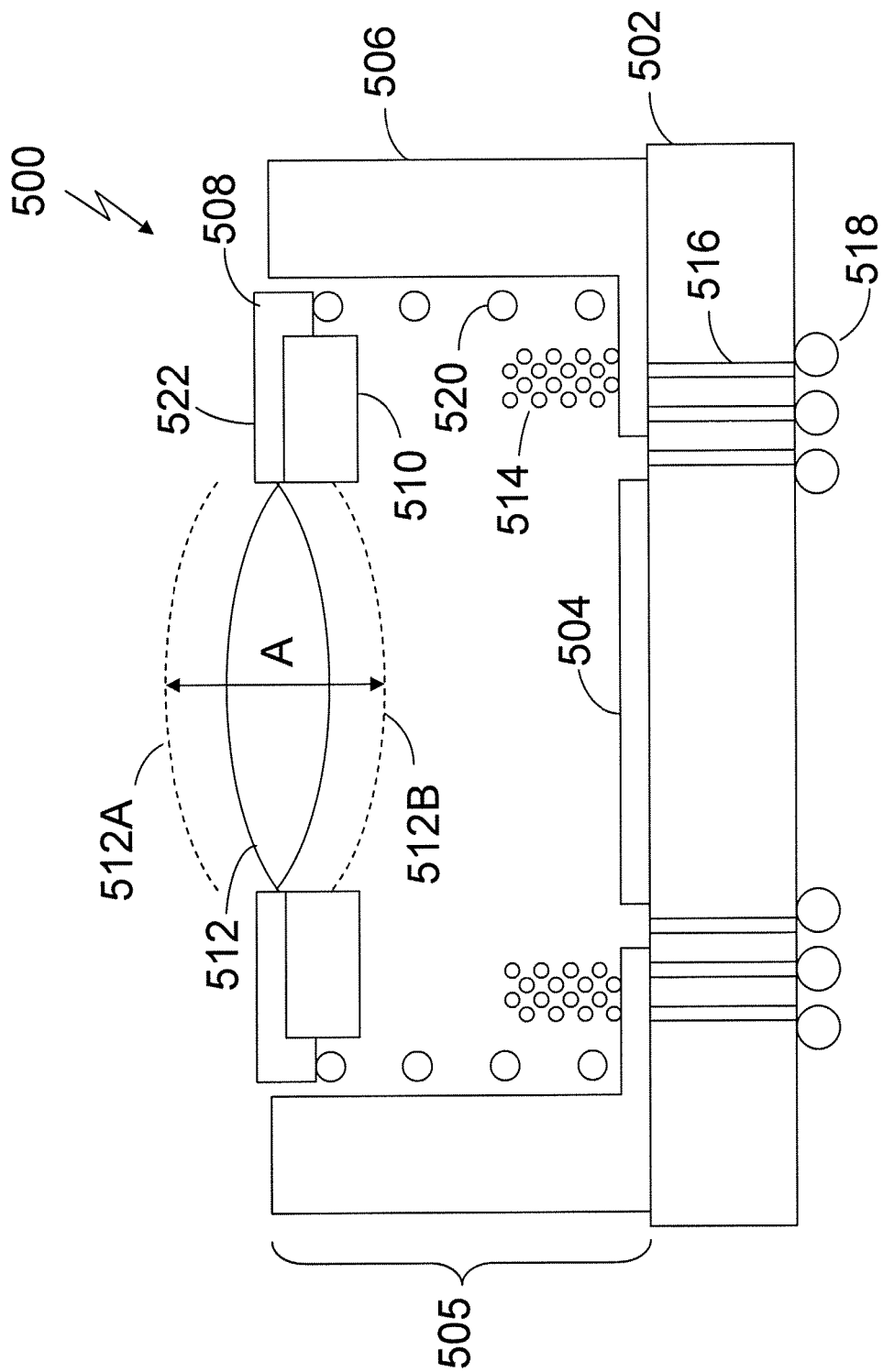
FIG. 5 is a cross-sectional view of an imaging device and a lens adjustment assembly according to another embodiment described herein.

FIG. 5 is a cross-sectional view of an imaging device 500 having a lens adjustment assembly 505 according to an another embodiment. Imaging device 500 includes a substrate 502 supporting an imaging device circuit 504, which includes a pixel array. The substrate 502 includes interconnects 516 and solder balls 518 as described above with regard to the embodiment shown in FIG. 2. Imaging device 500 also includes a lens adjustment assembly 505 that includes a support structure 506, a magnetic ring 510, ring supporter 522, voice coils 514, spring coils 520, and a lens 512.

The voice coils 514 are a driving unit that provides excitation pulses that exert a force on the magnetic ring 510 and begin a resonant motion of the lens 512. The spring coils 520 are elastic components that allow the lens 512 and magnetic ring 510 to move up and down in the directions denoted by arrow A to an upper displacement position 512A and a lower displacement position 512B. In one embodiment, the range of motion of the lens 512 may be about 0.5 mm.

The displacement of the lens 512 over time in conjunction with the excitation pulses in imaging device 500 is also depicted by FIG. 3. In imaging device 500, the voice coils 514 apply excitation pulses to the magnetic ring 510 to begin resonant movement of the lens 512. The spring coils 520 conserve the energy of the resonant motion of the lens 512 as the lens 512 moves up and down during each cycle. Therefore, the excitation pulses from the voice coils 112 are only needed to overcome motion loss due to friction.

The frequency and amplitude of the resonant movement of the lens 512 are dependent on the mass of the moving elements, i.e., the lens 512, the ring supporter 522, and the magnetic ring 510, and the spring constant of the spring coils 520. A greater or smaller cycle amplitude may be achieved by using larger or smaller excitation pulses.

As described above with regard to imaging device 100, the timing of the resonant motion of the lens 512 is synchronized to the operation of the imaging device circuit by a timing signal sent to the pixel array so that an image may be obtained at a desired lens position. The imaging device 500 is suitable for auto focus and other applications described above with regard to imaging device 100.

Figure 6:
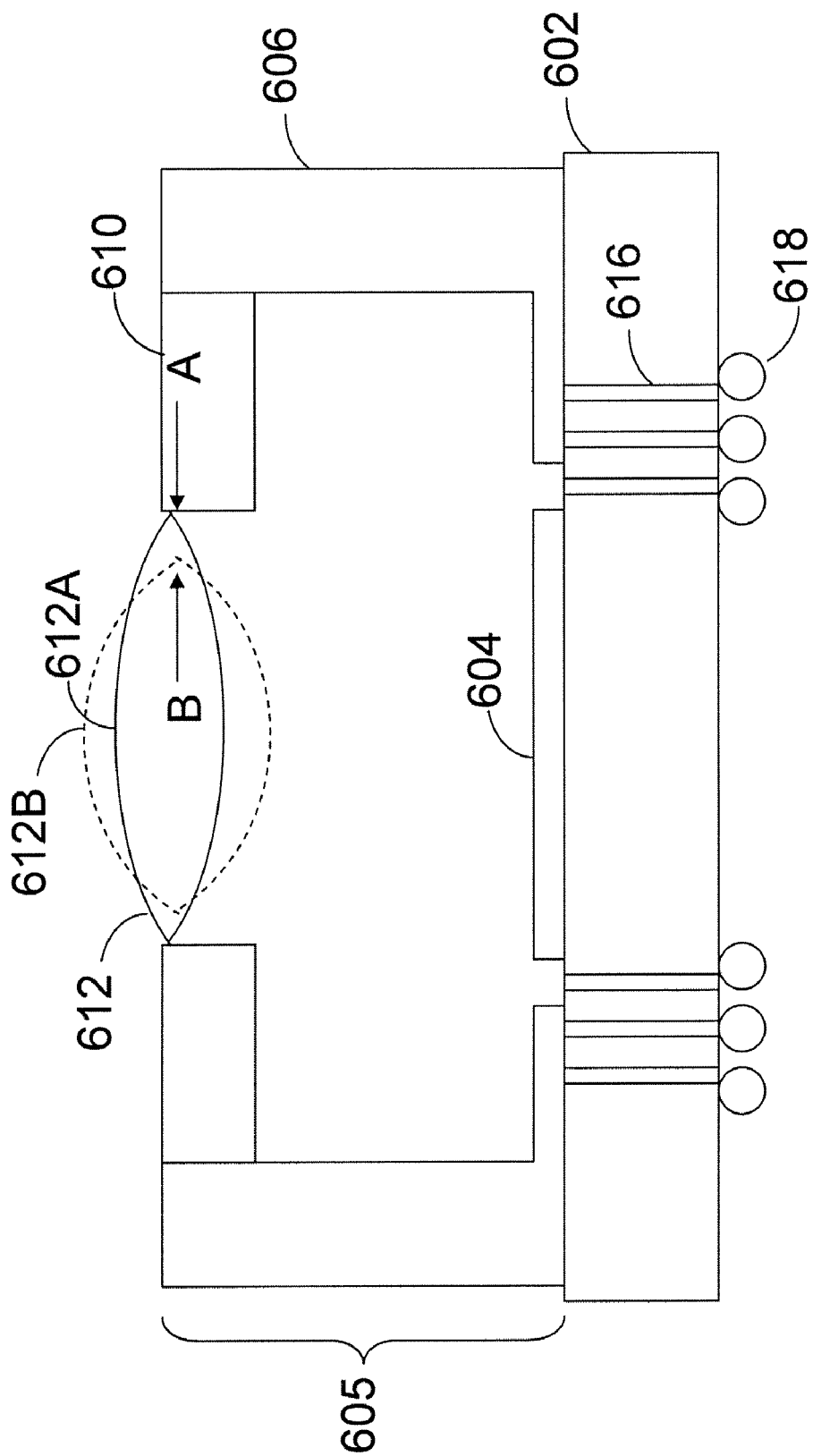
FIG. 6 is a cross-sectional view of an imaging device and a lens adjustment assembly according to another embodiment described herein.

FIG. 6 is a cross-sectional view of an imaging device 600 having a lens adjustment assembly 605 according to an another embodiment. Imaging device 600 includes a substrate 602 supporting an imaging device circuit 604. The substrate 602 includes interconnects 616 and solder balls 618 as described above with regard to imaging device 100. Imaging device 600 also includes a lens adjustment assembly 605 that includes a support structure 606, an electrically active polymer (EAP) actuator 610, and an elastomeric lens 612.

An electrically active polymer is an electrostatically driven polymer, such as an ionomer, that expand in volume in response to an applied voltage and decreases in volume when the voltage is removed. The electrically active polymer actuator 610 is a driving unit that includes an electrically active polymer that may be activated by an applied voltage. The electrically active polymer actuator 610 may be arranged in a ring surrounding the elastomeric lens and may be configured so that the electrically active polymer actuator 610 moves at least in the direction of arrow A when activated and in the direction of arrow B when deactivated.

The electrically active polymer actuator 610 provides excitation pulses that exert a force on the elastomeric lens 612 to begin resonant motion in the elastomeric lens 612. The elastomeric lens 612 itself is an elastic component and is arranged so that the movement of the electrically active polymer actuator 610 may cause resonant motion causing the elastomeric lens 612 to deform from a first shape having a lower displacement position 612A to a second shape having an upper displacement position 612B. The deformation of the elastomeric lens 612 causes the focus position of the lens 612 to move as the shape of the elastomeric lens 612 changes.

The displacement of the elastomeric lens 612 over time in conjunction with the excitation pulses in imaging device 600, is also depicted by FIG. 3. In imaging device 600, the electrically active polymer actuator 612 applies the excitation pulses to the elastomeric lens 612 to begin resonant movement of the elastomeric lens 612. The elastomeric lens 612 conserves the energy of the resonant motion of the elastomeric lens 612 as the elastomeric lens 612 deforms from a first shape to a second shape during each cycle.

The frequency and amplitude of the resonant movement of the elastomeric lens 612 are dependent on the elasticity and shape of the elastomeric lens 612. A greater or smaller cycle amplitude may be achieved by using larger or smaller excitation pulses.

As described above with regard to imaging device 100, the timing of the resonant deformation of the elastomeric lens 612 is synchronized to the operation of the imaging device circuit by a timing signal sent to the pixel array so that an image may be obtained at a desired lens position. The imaging device 600 is suitable for auto focus and other applications described above with regard to imaging device 100.

Figure 7:
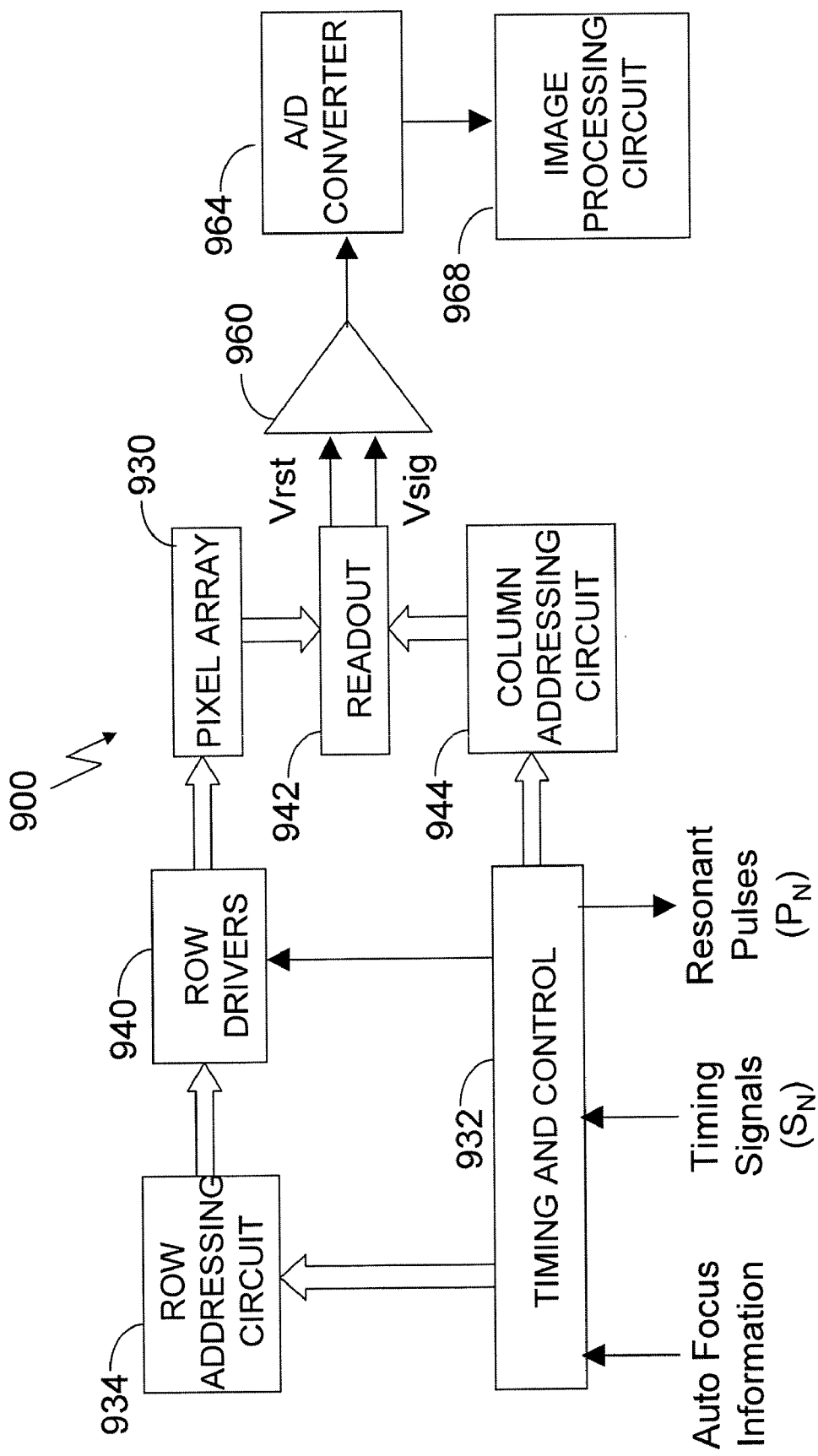
FIG. 7 is a block diagram of an imaging device according to embodiments described herein.

FIG. 7 shows a block diagram of an imaging device 900, e.g. a CMOS imaging device, which includes a lens adjustment assembly according to embodiments described herein. A timing and control circuit 932 provides timing and control signals for enabling the reading out of signals from pixels of the pixel array 930. In one embodiment, the timing and control circuit 932 may include an auto focus circuit, which receives auto information including a lens position where the best focus is obtained and the timing signals ($S_1, S_2 \ldots$) which are used to determine the actual lens position at a given time, and may provide the resonant timing pulses ($P_1, P_2 \ldots$) to the lens adjustment assembly to coordinate the timing of the pixel array with the motion of the lens. Alternatively, the circuit receiving the auto focus information and supplying the resonant timing pulses ($P_1, P_2 \ldots$) may be a circuit separate and apart from the timing and control circuit 932. The pixel array 930 has dimensions of M rows by N columns of pixels, with the size of the pixel array 930 depending on a particular application.

Signals from the imaging device 900 may be read out a row at a time using a column parallel readout architecture if a rolling or global shutter technique is used. The timing and control circuit 932 selects a particular row of pixels in the pixel array 930 by controlling the operation of a row addressing circuit 934 and row drivers 940. Signals stored in the selected row of pixels are provided to a readout circuit 942. The signals read from each of the columns of the array sequentially or in parallel using a column addressing circuit 944. For image acquisition, pixel array 930 can be operated in either a rolling shutter or global shutter mode.

In either a rolling shutter or global shutter system, pixel signals corresponding to a pixel reset signal Vrst and an image pixel signal Vsig are provided as outputs of the readout circuit 942, and are typically subtracted in a differential amplifier 960 and the result digitized by an analog to digital converter 964 to provide a digital pixel signal. The digital pixel signals represent an image captured by pixel array 930 and are processed in an image processing circuit 968 to provide an output image.

Figure 8:
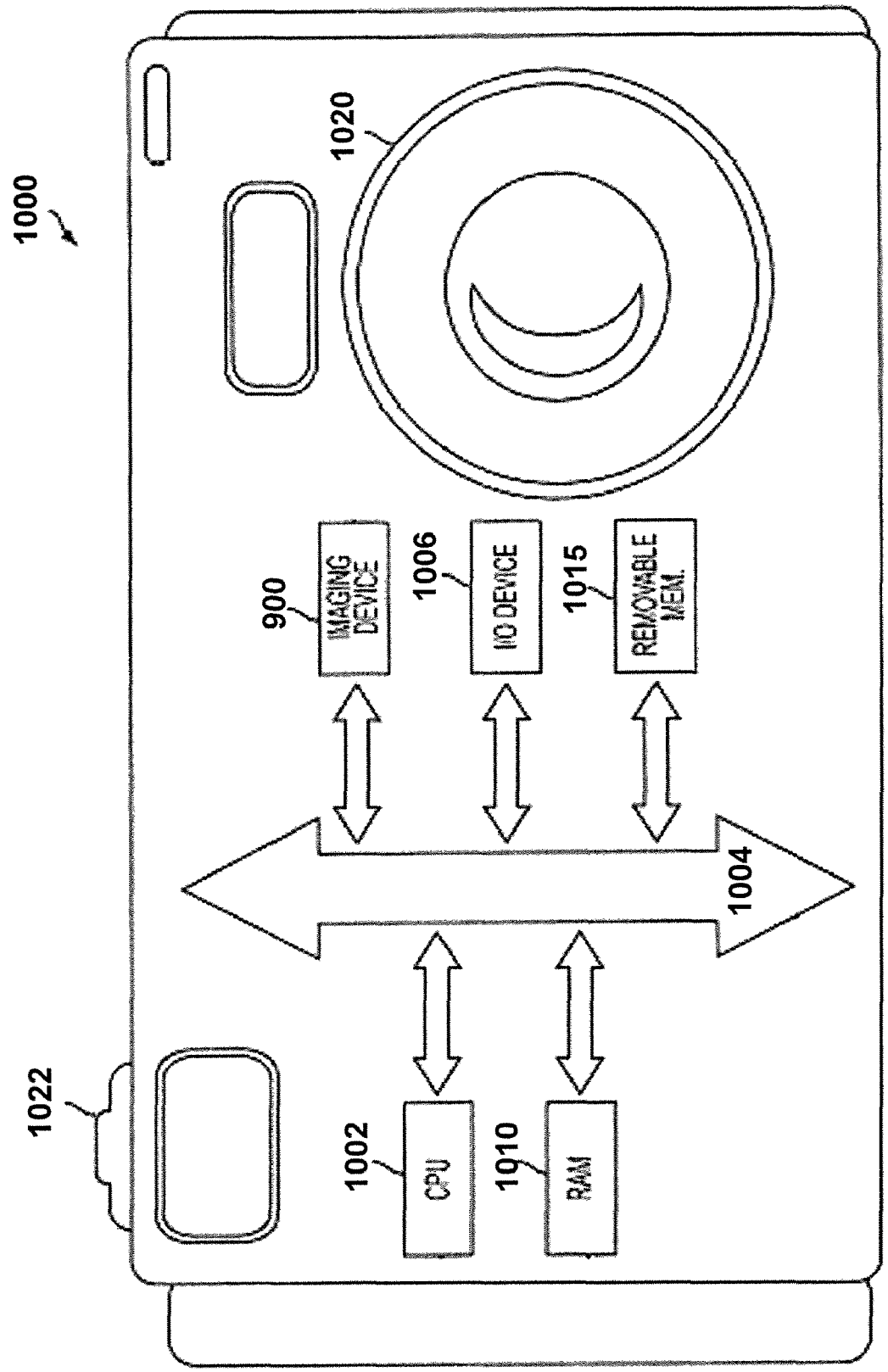
FIG. 8 is a block diagram of a processor system that includes an imaging device according to embodiments described herein.

FIG. 8 shows an imaging system 1000, for example, a camera system, that includes an imaging device 900 constructed and operated in accordance with the various embodiment described above, such as imaging devices 100, 500, and 600. The imaging system 1000 is shown in FIG. 8 as a camera system. Without being limiting, such a system 1000 could include a computer system, scanner, machine vision, vehicle navigation, video phone, surveillance system, auto focus system, star tracker system, motion detection system, image stabilization system, or other imaging system.

Camera system 1000, for example a digital still or video camera system, generally comprises a central processing unit (CPU) 1002, such as a control circuit or microprocessor for conducting camera functions, that communicates with one or more input/output (I/O) devices 1006 over a bus 1004. Imaging device 900 also communicates with the CPU 1002 over the bus 1004. The processor system 1000 also includes random access memory (RAM) 1010, and can include removable memory 1015, such as flash memory, which also communicates with the CPU 1002 over the bus 1004. The imaging device 900 may be combined with the CPU processor with or without memory storage on a single integrated circuit or on a different chip than the CPU processor. In a camera system, a lens adjustment assembly 1020 according to embodiments described herein, such as lens adjustment assemblies 105, 505, and 605, is used to focus image light onto the pixel array 930 of the imaging device 900 and an image is captured when a shutter release button 1022 is pressed.

Although the embodiments described above include methods and apparatuses for moving a lens in a resonant motion, it should be appreciated that in other embodiments, the lens may be stationary and the imaging device circuit 104 pixel array may instead be moved in a resonant motion.

The above description and drawings are only to be considered illustrative of specific embodiments, which achieve the features and advantages described herein. Modification and substitutions to specific structures and methods can be made and features of the various disclosed embodiments may be combined without departing from the spirit and scope of the invention, which is defined by the appended claims.

What is claimed as new and desired to be protected by Letters Patent of the United States is:

1. A method of focusing an image on an pixel array comprising:
   resonantly changing the distance between a lens and a pixel array from a first distance to a second distance; and
   obtaining an image projected onto the pixel array through the lens while the distance between the lens and the pixel array is resonantly changing.

2. The method of claim 1, wherein the distance between the lens and the pixel array is resonantly changed by continuously moving the pixel array from a first position to a second position.

3. The method of claim 1, wherein the distance between the lens and the pixel array is resonantly changed by continuously moving the lens from a first position to a second position.

4. The method of claim 1, further comprising:
   determining a distance from an object to the pixel array,
   correlating the distance from the object to the pixel array to a distance between the lens and the pixel array at which the object is known to be in focus, and
   obtaining the image when the lens is at the position at which the object is known to be in focus.

5. The method of claim 1, further comprising:
   obtaining multiple images at multiple distances between the lens and the pixel array; and
   determining at which position the image is most in focus.

6. A method of focusing an image on an pixel array comprising:
   oscillating a lens between a first position to a second position relative to a pixel array; and
   obtaining an image projected onto the pixel array through the lens while the lens is oscillating.

7. The method of claim 6, further comprising oscillating the lens using an electromechanical structure comprising at least one of an elastic ring, a spring, and an elastic lens.

8. The method of claim 6, further comprising oscillating the lens from the first position to the second position by applying force pulses to the electromechanical structure.

9. The method of claim 8, further comprising providing force pulses to the electromechanical structure using at least one of actuation coils, voice coils, and an electrically active polymer actuator.

10. The method of claim 6, further comprising providing a timing signal to the pixel array to report the position of the lens.

11. A method of focusing an image on an pixel array comprising:
    changing the distance between a lens and a pixel array from a first distance to a second distance over a series of resonant cycles; and
    obtaining multiple images projected onto the pixel array through the lens while the distance between the lens and the pixel array is resonantly changing.

12. The method of claim 11, further comprising obtaining the multiple images during multiple resonant cycles and compiling the multiple images into one image.

13. The method of claim 12, wherein the multiple images are obtained with the lens at a different distance from the pixel array during each of the multiple resonant cycles.

14. The method of claim 11, wherein each of the multiple images consists of a portion of a scene, and wherein the multiple images are obtained during multiple resonant cycles.

15. The method of claim 14, wherein the portions of the scene comprises of the image from one or more rows of pixels.

16. The method of claim 14, wherein the portions of the scene consists of the image from pixels of the same color.

17. The method of claim 16, wherein each portion of the scene is obtained at a different lens position.

18. The method of claim 14, wherein one portion of the scene comprises an object and another portion of the scene comprises a background, and wherein the portion of the scene that comprises the object is obtained when the lens is at a distance from the pixel array such that the object is in focus, and the portion of the scene that comprises the background is obtained when the lens is at a distance from the pixel array such that the background is out of focus.

19. An imaging device comprising:
    a pixel array comprising a plurality of pixels;
    a lens arranged to project light onto the pixel array;
    an electromechanical structure for resonantly changing a distance between the pixel array and the lens between a first distance and a second distance; and
    a control circuit for causing the pixel array to capture an image while the distance between the pixel array and the lens is oscillating.

20. The imaging device of claim 19, wherein the electromechanical structure oscillates the pixel array between a first position and a second position.

21. The imaging device of claim 19, further comprising a timing and control circuit for providing a timing signal to the pixel array to denote the distance of the lens and the pixel array.

22. The imaging device of claim 19, wherein said imaging device is part of a camera system.

23. An imaging device comprising:
a pixel array comprising a plurality of pixels;
a lens arranged to project light onto the pixel array;
an electromechanical structure for resonantly moving a lens between a first position to a second position relative to a pixel array; and
a control circuit for causing the pixel array to capture an image while the lens is resonantly moving,
wherein the electromechanical structure comprises an elastic component arranged such that the lens may resonantly move between the first position and the second position, and a driving unit for providing force pulses to the lens.

24. The imaging device of claim 23, wherein the elastic component comprises at least one of a spring, an elastic member arranged around the lens, and an elastic lens.

25. The imaging device of claim 23, wherein the driving unit comprises at least one of an actuation coil, a magnet, a voice coil, and an electrically active polymer actuator.

* * * * *